United States Patent
Gill

(10) Patent No.: US 6,751,845 B2
(45) Date of Patent: Jun. 22, 2004

(54) METHOD OF MAKING A CONTINUOUS JUNCTION SPIN VALVE READ HEAD STABILIZED WITHOUT HARD BIAS LAYERS

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 09/878,673

(22) Filed: Jun. 11, 2001

(65) Prior Publication Data

US 2001/0028541 A1 Oct. 11, 2001

Related U.S. Application Data

(62) Division of application No. 09/344,079, filed on Jun. 25, 1999, now Pat. No. 6,292,335.

(51) Int. Cl.[7] ............................ G11B 5/127; G11B 5/33; H04R 31/00
(52) U.S. Cl. ................. 29/603.14; 29/603.07; 29/603.13; 29/603.09; 29/603.27; 360/324.12
(58) Field of Search ................... 29/603.07, 603.13, 29/603.14, 603.09, 603.27; 360/324.12, 317

(56) References Cited

U.S. PATENT DOCUMENTS

| | | | | |
|---|---|---|---|---|
| 5,408,377 A | * | 4/1995 | Gurney et al. | 360/325 |
| 5,608,593 A | * | 3/1997 | Kim et al. | 360/324.12 |
| 5,668,688 A | * | 9/1997 | Dykes et al. | 360/324.1 |
| 5,739,988 A | * | 4/1998 | Gill | 360/324.12 |
| 5,796,561 A | * | 8/1998 | Mauri | 360/324.11 |
| 6,040,962 A | * | 3/2000 | Kanazawa | 360/327.32 |
| 6,055,135 A | * | 4/2000 | Fukamichi | 360/327.32 |

* cited by examiner

Primary Examiner—Carl J. Arbes
Assistant Examiner—Tai Nguyen
(74) Attorney, Agent, or Firm—Ervin F. Johnston

(57) ABSTRACT

A spin valve sensor with a continuous junction is provided which has a sensor portion of a free layer longitudinally biased by first and second AFM biasing layers that are exchange coupled to first and second side portions of the free layer and a sensor portion of an AFM pinning layer that pins a sensor portion of a pinned layer perpendicular to the ABS in either a top spin valve or a bottom spin valve sensor. Magnetic spins of the first and second AFM biasing layers are set by a field longitudinal to the free layer in the presence of heat at the wafer level and magnetic spins of the sensor portion of the AFM pinning layer are set by a current pulse through the first and second leads to the spin valve sensor which sufficiently heat the sensor portion and cause a current pulse field from the free layer which acts on a pinned layer in the spin valve sensor to set the magnetic spins of the sensor portion of the AFM pinning layer perpendicular to the ABS without disturbing the orientation of the magnetic spins of the first and second AFM biasing layers.

26 Claims, 9 Drawing Sheets

(ABS)

METHOD OF MAKING A CONTINUOUS JUNCTION SPIN VALVE READ HEAD STABILIZED WITHOUT HARD BIAS LAYERS

This is a division of application Ser. No. 09/344,079 filed Jun. 25, 1999 now U.S. Pat. No. 6,292 335.

BACKGROUND OF THE INVENTION

1. Field of the Invention

The present invention relates to a continuous junction spin valve read head stabilized without hard bias layers and, more particularly, to first and second antiferromagnetic (AFM) layers exchange coupled to the spin valve sensor for stabilizing a free layer and a third AFM layer for pinning the magnetic moment of a pinned layer of the spin valve sensor.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk adjacent the ABS causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic field in the pole pieces which causes flux across the gap at the ABS for the purpose of writing the aforementioned magnetic impression in tracks on moving media, such as in circular tracks on the aforementioned rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to magnetic field signals from the rotating disk. The magnetization of the pinned layer is typically pinned by exchange coupling with an antiferromagnetic layer.

The thickness of the spacer layer is less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic field signals from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When the spin valve sensor employs an antiparallel (AP) pinned layer it is referred to as an AP pinned spin valve. A spin valve is also know as a top or bottom spin valve depending upon whether the pinning layer is at the top (formed after the free layer) or at the bottom (before the free layer). A pinning layer in a bottom spin valve is typically made of nickel oxide (NiO). The spin valve sensor is located between first and second nonmagnetic electrically insulative read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

It is important that the free layer of the spin valve sensor be magnetically stable. During a typical construction of a spin valve sensor a bilayer photoresist is formed on top of multiple full film material layers of the spin valve sensor. These fill film layers are then ion milled to form the spin valve sensor with first and second side edges that are typically tapered at an angle θ with respect to a normal to the planes of the layers. First and second hard bias layers and first and second lead layers are then deposited with the bilayer photoresist still in place forming what is known in the art as contiguous junctions of the hard bias and lead layers with the first and second side edges of the spin valve sensor. Magnetostatic fields from the first and second hard bias layers are employed for the purpose of aligning the magnetic moments of the free layer so that they are all in the same direction in a single domain state. Without the hard bias layers the free layer is in a multi-domain state with the magnetic domains being defined by numerous walls. The narrower the track width the greater the magnetic instability of the free layer. When the free layer is subjected to magnetic field signals from the rotating disk the domain walls move around which creates magnetic noise that is superimposed upon the read signal.

The aforementioned process of making contiguous junctions inherently results in a taper of the first and second side edges of the layers of the sensor. Unfortunately, the greater the angle or taper of the first and second side edges of the spin valve sensor the less the effectiveness of the first and second hard bias layers. When the first and second side edges of the spin valve sensor are tapered the first and second hard bias layers take on the soft magnetic properties of the free layer causing the first and second hard bias layers to be magnetically more soft and less capable of applying a magnetostatic coupling for stabilizing the free layer. The first and second hard bias layers are at their maximum effectiveness when the first and second side edges of the spin valve sensor are vertical or parallel to a normal to the planes of the layers. This vertical configuration has not been obtainable with the bilayer photoresist and ion milling steps for forming the first and second side edges of the spin valve sensor. Accordingly, there is a strong-felt need for a biasing scheme to longitudinally bias the free layer into a single domain state which is not degraded by sloping side edges of the sensor.

SUMMARY OF THE INVENTION

Pursuant to the above objective, I investigated a scheme employing first and second antiferromagnetic layers in contact with the first and second side portions of the spin valve sensor for magnetically stabilizing the free layer. A third antiferromagnetic layer was exchange coupled to the pinned layer of the spin valve sensor for pinning the magnetic moment of the pinned layer perpendicular to the ABS. A wafer, upon which multiple read heads were constructed, was subjected to heat in the presence of a magnetic field that was directed longitudinal to the free layer, namely parallel to the ABS along the track width of the read head for setting the magnetic spins of the first and second antiferromagnetic layers in the direction of the applied field. The heat raised the temperature of the entire wafer at or above the blocking temperature of the first and second antiferromagnetic layers. The blocking temperature is the temperature at which the magnetic spins of the first and second antiferromagnetic layers are free to rotate in response to a field applied to the pinned layer. The first and second antiferromagnetic layers were made of a material, such as nickel manganese (NiMn) or platinum manganese (PtMn) with a high blocking temperature of about 300° C. The third antiferromagnetic layer for pinning the pinned layer of the spin valve sensor was made of a material, such as nickel oxide (NiO) or iridium manganese (IrMn) with a lower blocking temperature of about 250° C.

The wafer was then subjected to heat in the presence of a field which is directed perpendicular to the ABS for setting the magnetic spins of the third antiferromagnetic layer perpendicular to the ABS. Even though the second temperature of 250° C. is less than the first temperature of 300° C., the setting of the magnetic spins of the third antiferromagnetic layer degraded the initial setting of the magnetic spins of the first and second antiferromagnetic layers. This is due to the fact that even though the second blocking temperature is lower than the first blocking temperature the magnetic spins of the first and second antiferromagnetic layers are partially rotated during the second step of setting the magnetic spins of the third antiferromagnetic layer. This degradation then reduces the effectiveness of the longitudinal biasing of the free layer by the first and second AFM layers. Accordingly, while the scheme of employing antiferromagnetic layers instead of hard biasing layers overcomes the coupling problem, the process steps in setting the third antiferromagnetic layer for pinning the pinned layer degrades the performance of the first and second antiferromagnetic layers which longitudinally bias the free layer.

I next investigated employing first and second antiferromagnetic layers for longitudinally biasing and magnetically stabilizing the free layer and a third antiferromagnetic layer for pinning a pinned layer on a continuous junction type of spin valve sensor. The continuous junction type spin valve sensor differs from the contiguous junction spin valve sensor in that the pinned, spacer and free layers of the spin valve sensor extend not only within the sensor region of the spin valve sensor but also extend into first and second side regions on each side of the sensor regions. Accordingly, each layer of the spin valve sensor extends throughout a sensor region and first and second side regions with the first and second antiferromagnetic layers exchange coupled to first and second side portions of the free layer for stabilizing the free layer and the third antiferromagnetic layer is exchange coupled to the pinned layer and extends within the sensor region and preferably extends also within the first and second side regions. The sensor region of the read head is defined by the width of the bottom portion of the spin valve sensor and the first and second side regions are located on each side of the sensor region. An advantage of the continuous junction read head over the contiguous junction read head is that first and second side edges do not have to be formed by photoresist patterning and ion milling. This saves numerous process steps and avoids a redeposition problem of material layers ion milled during the ion milling step. Further, with the continuous junction spin valve sensor the first and second antiferromagnetic pinning layers make surface to surface contact with the first and second side portions of the free layer so as to provide an improved exchange coupling.

A method of the invention includes setting the magnetic spins of the sensor portion of the third AFM layer so that an initial setting of the magnetic spins of the first and second AFM layers is not degraded. The first and second AFM layers are set by heat in the presence of a field which is directed parallel to a longitudinal axis of the free layer. This may be accomplished at the wafer level or at the row level where the wafer has been cut into rows of heads. Next, a pulse is conducted through the spin valve sensor via first and second terminals on the wafer and first and second leads to the spin valve sensor causing the free layer to exert a current pulse field on the pinned layer which, in turn, orients the magnetic spins of the third AFM layer in the same direction. The current pulse heats the head discretely throughout sensor portions of the layers of the spin valve sensor and the third AFM layer without unduly heating the first and second AFM layers. Accordingly, the sensor portion of the third AFM layer is set to a perpendicular position without degrading the setting of the longitudinal orientation of the magnetic spins of the first and second AFM layers. The continuous junction spin valve sensor may be either a bottom spin valve sensor where the free layer is closer to the first gap layer than to the second read gap layer or a top spin valve sensor where the free layer is closer to the second read gap layer than to the first read gap layer. The aforementioned method of the invention applies to either a bottom spin valve sensor or a top spin valve sensor.

An object of the present invention is to provide a continuous junction spin valve sensor wherein first and second antiferromagnetic biasing layers longitudinally bias a free layer for stabilizing its performance.

Another object is to employ an antiferromagnetic scheme for effectively longitudinally biasing a free layer and pin a pinned layer of a continuous junction spin valve sensor.

A further object is to provide a method of making a continuous junction spin valve read head wherein the setting of the magnetic spins of first and second antiferromagnetic layers for longitudinally biasing a free layer is not degraded by magnetically setting the magnetic spins of a third antiferromagnetic layer for pinning a magnetic moment of a pinned layer.

Other objects and advantages of the invention will become apparent upon reading the following description taken together with the accompanying drawings.

DESCRIPTION OF THE PREFERRED EMBODIMENTS

Magnetic Disk Drive

Figure 1:
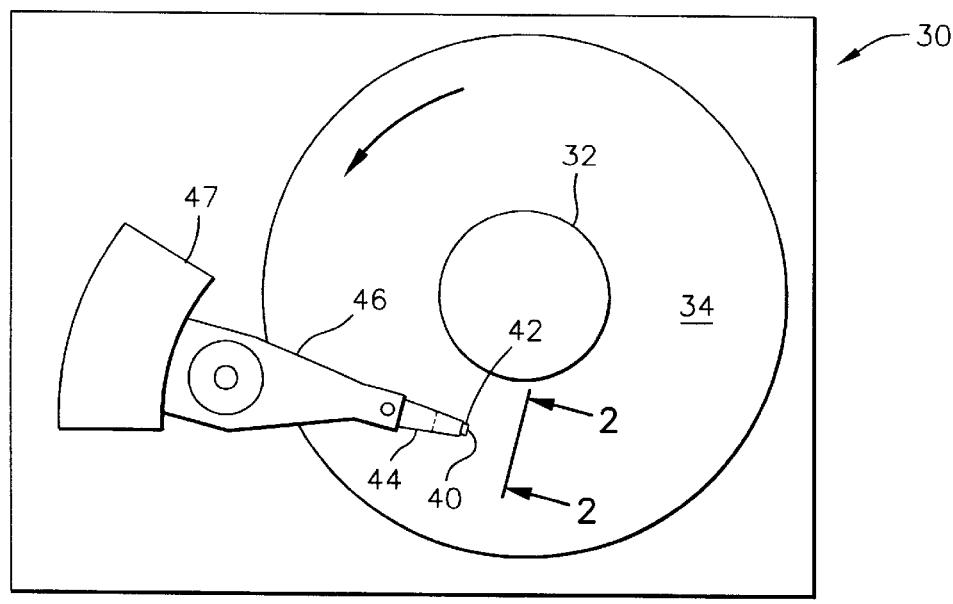
FIG. 1 is a planar view of an exemplary magnetic disk drive.
Figure 2:
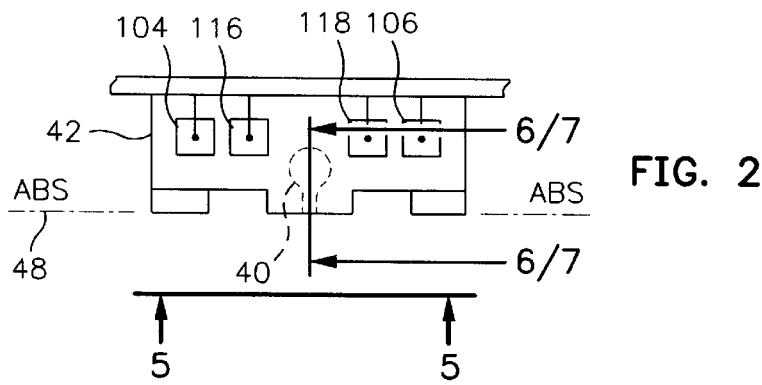
FIG. 2 is an end view of a slider with a magnetic head of the disk drive as seen in plane 2—2.
Figure 3:
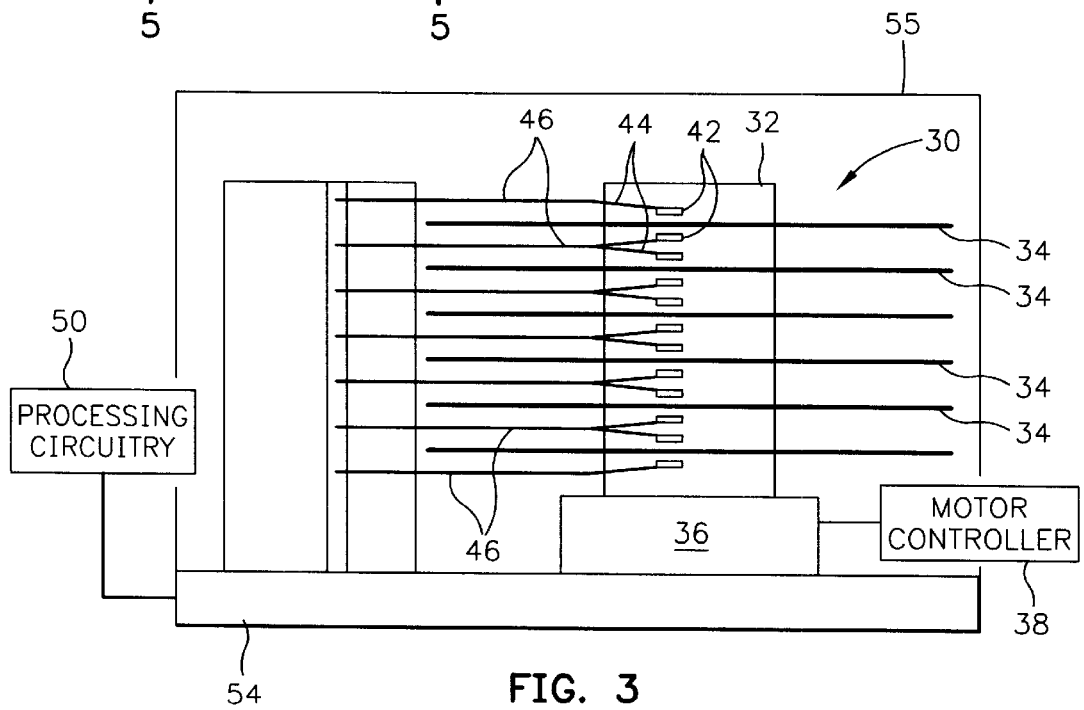
FIG. 3 is an elevation view of the magnetic disk drive wherein multiple disks and magnetic heads are employed.
Figure 4:
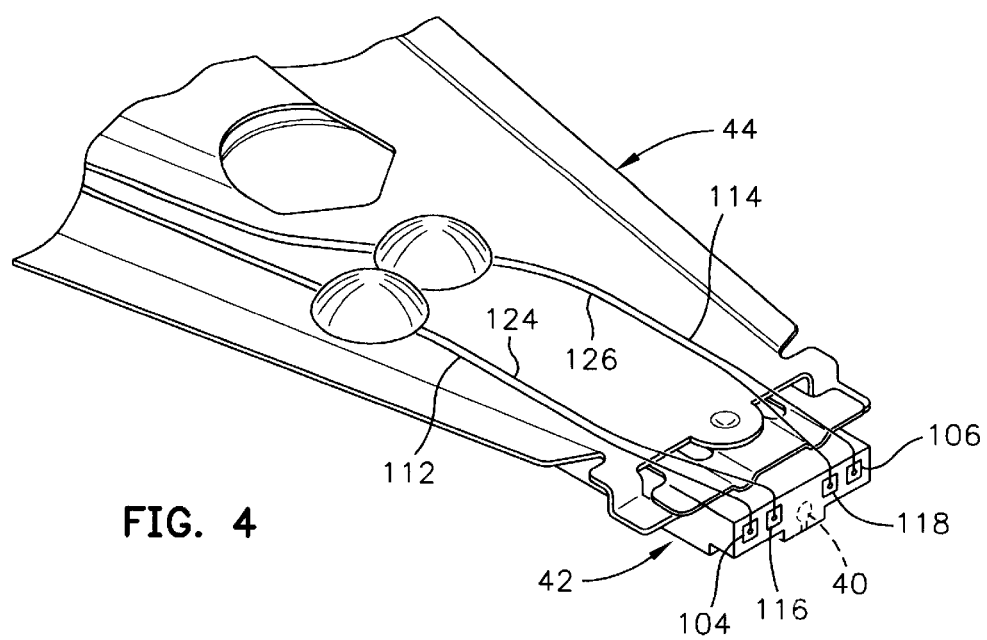
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 which is rotatably positioned by an actuator 47. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
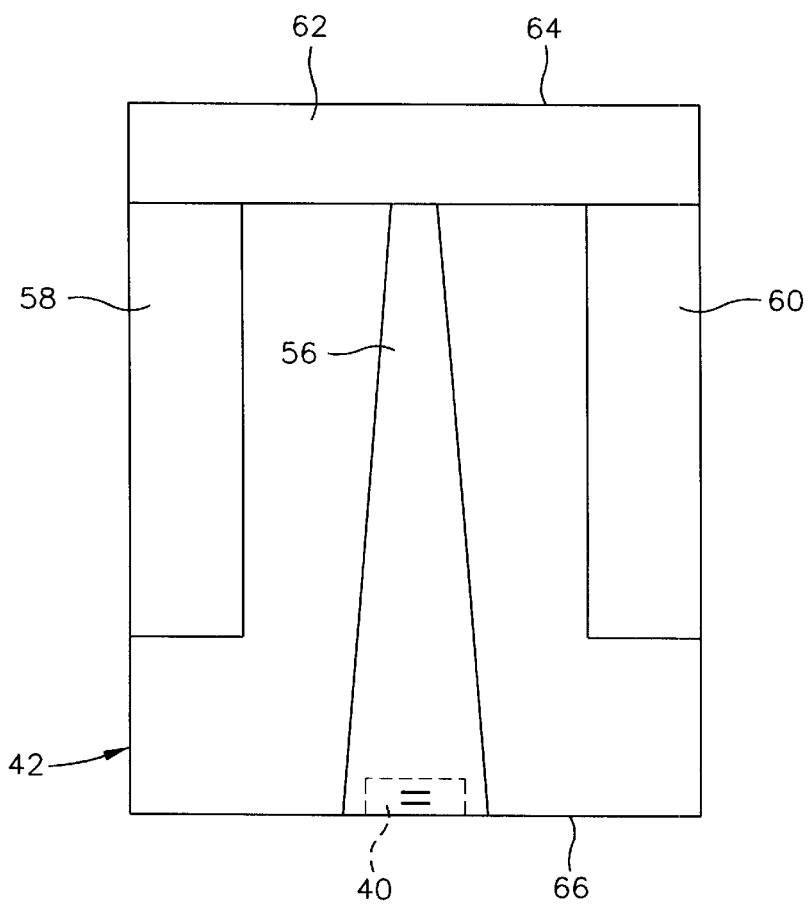
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
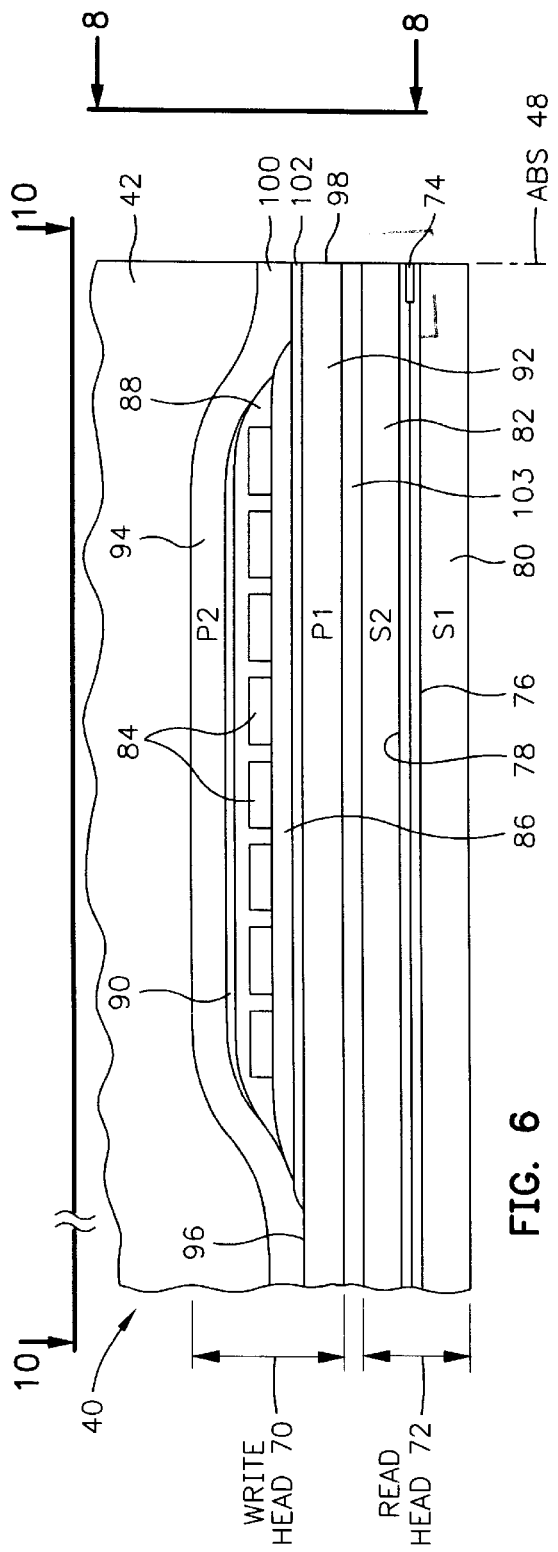
FIG. 6 is a partial view of the slider and a piggyback magnetic head as seen in plane 6—6 of FIG. 2.
Figure 8:
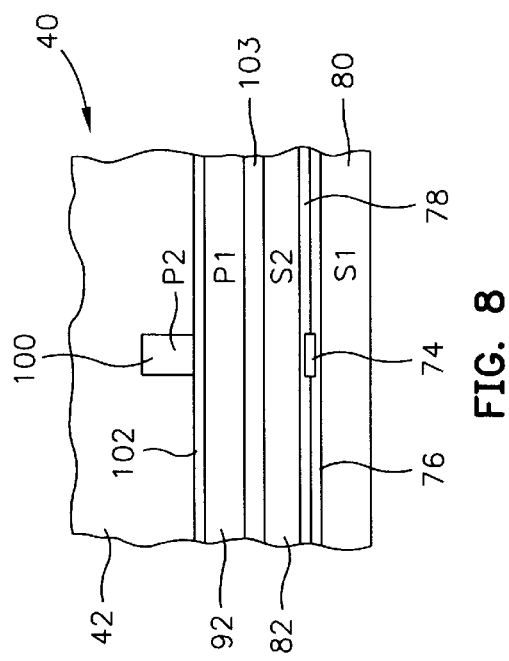
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
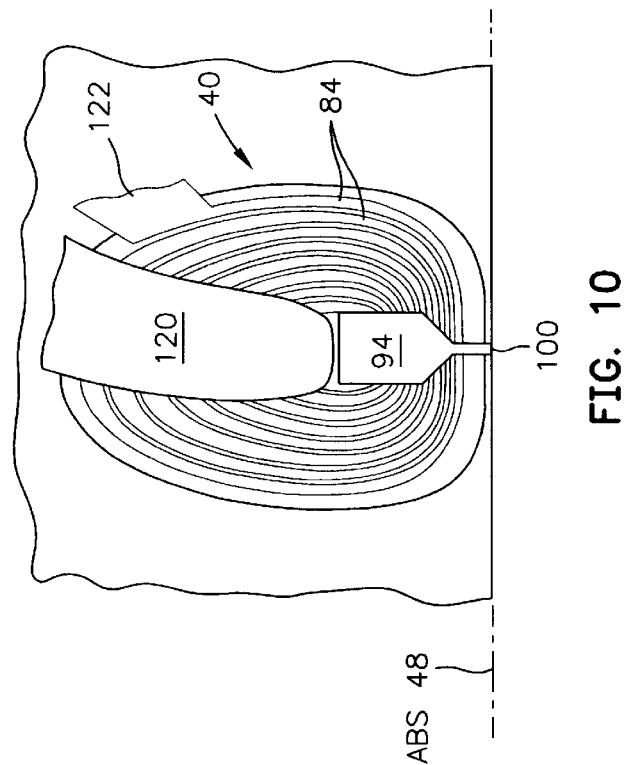
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
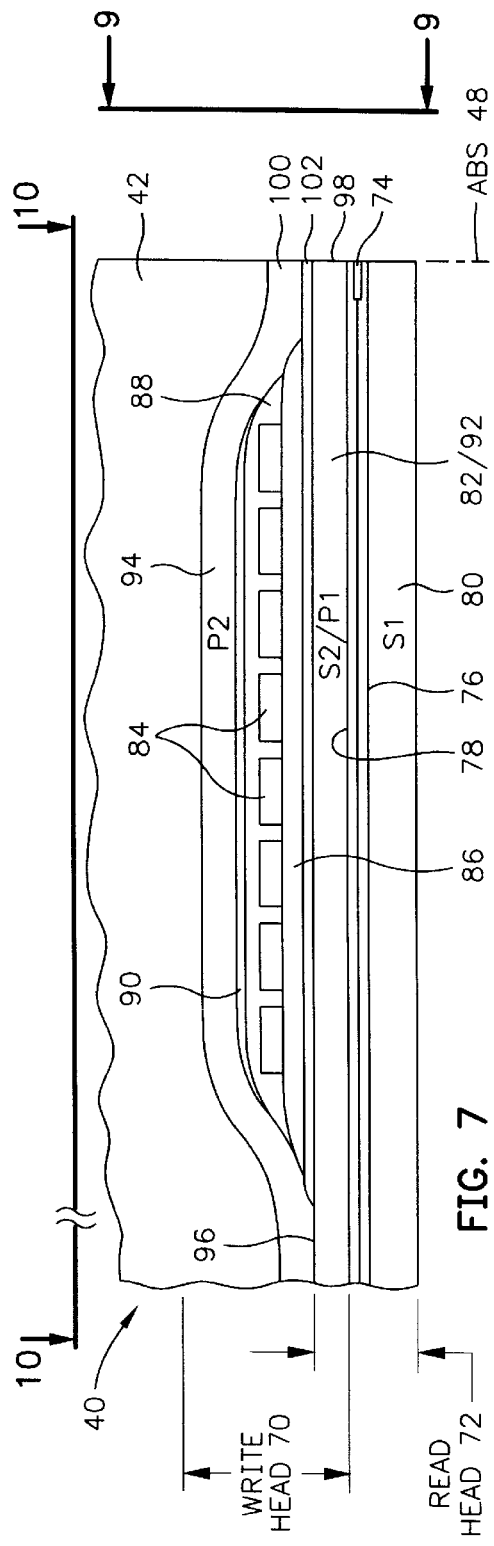
FIG. 7 is a partial view of the slider and a merged magnetic head as seen in plane 7—7 of FIG. 2.
Figure 9:
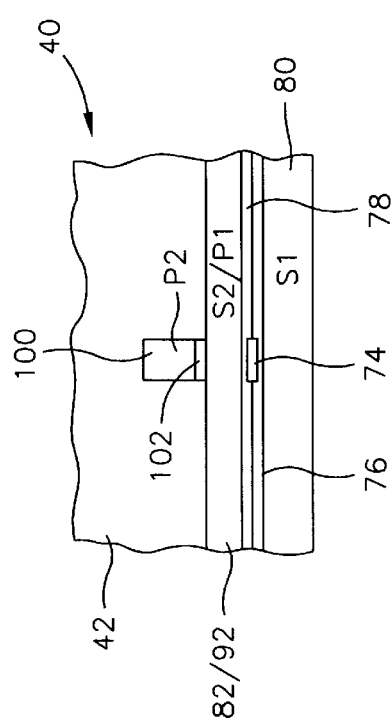
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
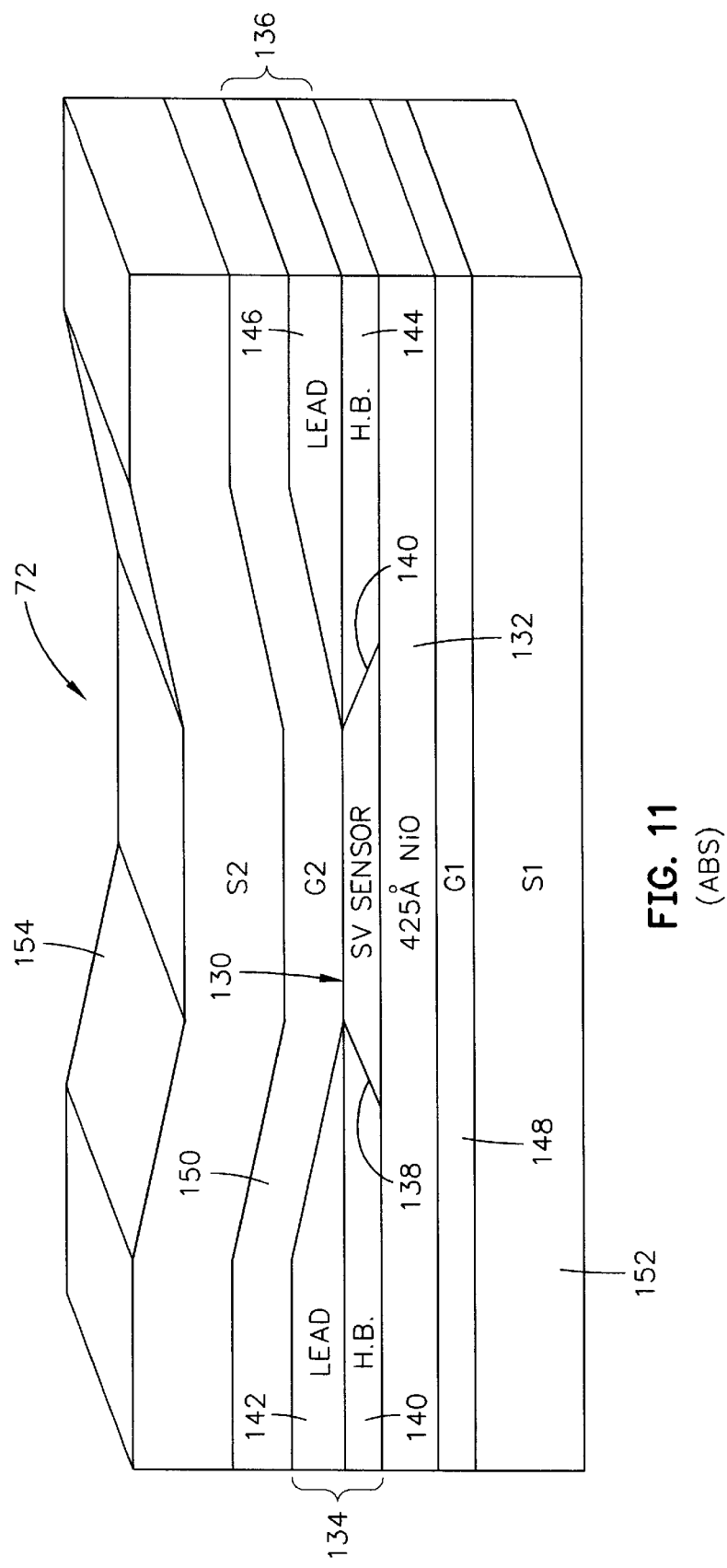
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. An antiferromagnetic pinning layer 132, such as 425 Å of nickel oxide (NiO), may be employed for pinning a magnetic moment of a pinned layer of the spin valve sensor 130 perpendicular to the ABS. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

It should be noted from FIG. 11 that the first and second side edges 138 and 140 of the spin valve sensor 130 are tapered at an angle θ to a normal to the planes of the layers, such as layers 148 and 132. The greater the taper the less the effectiveness of the first hard bias layers 140 and 144. Because of the taper, the first and second hard bias layers 140 and 144 take on soft properties of a free layer of the spin valve sensor 132 causing the first and second hard bias layers to lose their hard bias effectiveness. The tapering of the first and second side edges 138 and 140 is caused by a processing step which employs a bilayer photoresist. When the wafer is ion milled, shadowing effects from the bilayer photoresist causes the tapering side edges. While the photoresist mask is still in place the hard bias layers 140 and 144 are deposited followed by the leads 142 and 146, after which the bilayer photoresist is removed. There is a strong-felt need of an improved scheme for longitudinally biasing the free layer of the spin valve sensor 130.

The Invention

Figure 12:
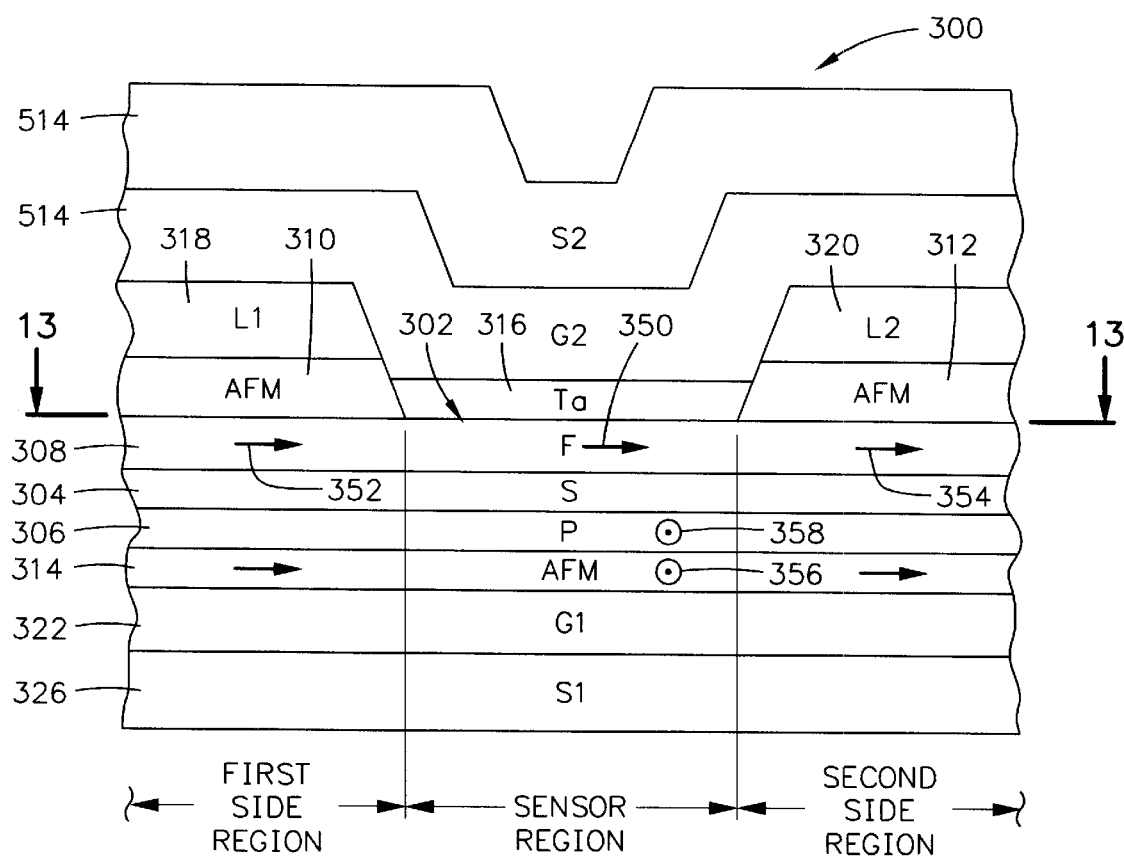
FIG. 12 is an ABS illustration of a first embodiment of the present invention.

A first embodiment 300 of the present invention is illustrated in FIG. 12. This embodiment is a continuous junction type spin valve sensor and differs from the contiguous type spin valve sensor 130 shown in FIG. 11 in that the layers of the spin valve sensor have sensor portions which are located in a sensor region of the read head and first and second side portions which are located in first and second side regions of the read head on each side of the sensor region. A read sensor 302 includes a spacer layer 304 which is located between a pinned layer (P) 306 and a free layer (F) 308. First and second antiferromagnetic biasing layers (AFM) 310 and 312 are exchange coupled to first and second side portions of the free layer 308 for longitudinally biasing the sensor portion of the free layer to the left or to the right, as shown by the arrows in FIG. 12. A third antiferromagnetic layer 314 is exchange coupled to the pinned layer 306 for pinning a magnetic moment of the pinned layer perpendicular to the ABS, either away from the ABS or toward the ABS, as shown by the circles with a dot (⊙) in FIG. 12. It should be noted that the magnetic spins of the first and second side portions of the pinning layer 314 may be oriented parallel to the ABS 90° to the orientation of the magnetic spins in the sensor region thereof, which will be explained in more detail hereinafter in the discussion of the method of setting the magnetic spins of the first, second and third antiferromagnetic layers 310, 312 and 314.

A tantalum (Ta) layer 316 may be located on the free layer between first and second antiferromagnetic biasing layers 310 and 312 for protecting the sensor region of the free layer 308 from subsequent processing steps. First and second lead layers (L1) and (L2) 318 and 320 are electrically connected to the first and second AFM biasing layers 310 and 312 for conducting a sense current through the sensor portions of the free layer 308, the spacer layer 304 and the pinned layer 306. The sense current, or a current in the sense current circuit, is instrumental in setting the magnetic spins of the sensor region of the third AFM layer 314, which will be described hereinafter in the method of making. The spin valve sensor 302, including the tantalum (Ta) layer 316 and the first and second lead layers 318 and 320, are located between nonmagnetic nonconductive first and second read gap layers (G1) and (G2) 322 and 324 and the first and second read gap layers 322 and 324 are located between ferromagnetic first and second shield layers (S1) and (S2) 326 and 328. The sensor 300 will be referred to as a continuous junction spin valve sensor. The sensor 300 is also classified as a bottom spin valve sensor since the pinning layer 314 and the pinned layer 306 are formed on the first gap layer 322 before formation of the free layer 308. Accordingly, in a bottom spin valve sensor the free layer 308 is located closer to the second read gap layer 324 than it is to the first read gap layer 322.

Figure 13:
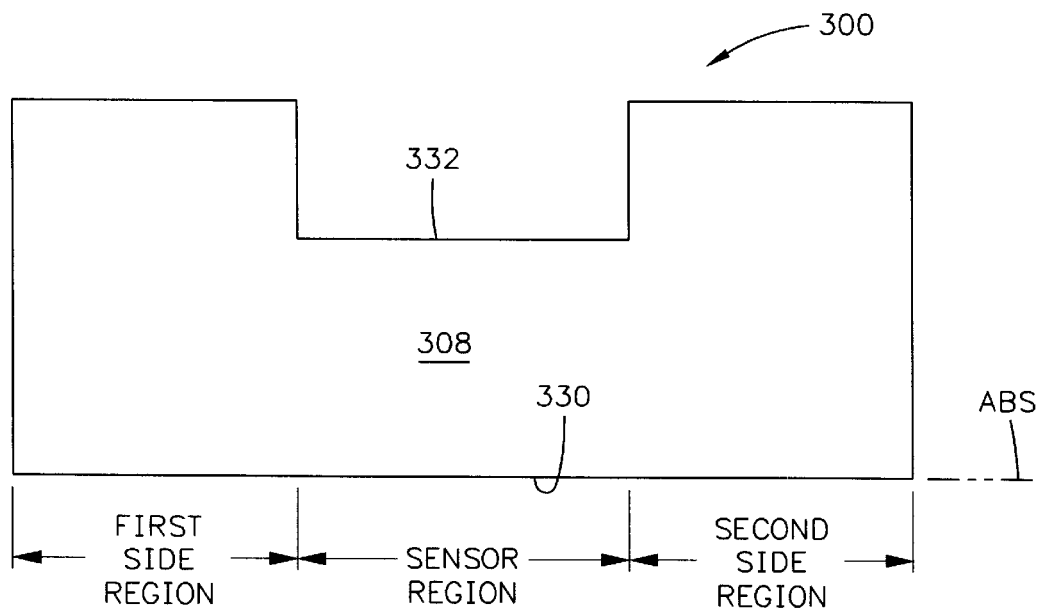
FIG. 13 is a view taken along plane 13—13 of FIG. 12.

FIG. 13 is atop view of the free layer 308 taken along plane 13—13 of FIG. 12. The free layer 308 has an edge 330 at the ABS and an opposite recessed edge 332. The edge 332 is formed by photopatterning and ion milling. The first and second AFM layers 310 and 312 are then deposited on the first and second side regions of the free layer 308 which are further recessed into the head from the back edge 332. The distance between the edges 330 and 332 define a stripe height of the sensor. The first and second lead layers 318 and 320 are located on the first and second AFM layers 310 and 312, as shown in FIG. 12, with the AFM layers 310 and 312 therebetween being a conductive material, such as nickel manganese (NiMn), iron manganese (FeMn), cobalt platinum manganese (CoPtMn) or iridium manganese (IrMn). A third AFM pinning layer 314 is formed of an antiferromagnetic material that has a low blocking temperature, such as iron manganese (FeMn), which has a blocking temperature of 160° C., or iridium manganese (IrMn), which has a blocking temperature of 250° C. Since iridium manganese (IrMn) can function as an antiferromagnetic layer with a thickness of only 80 Å, as compared to 200 Å for an iron manganese (FeMn) AFM pinning layer, the iridium manganese (IrMn) is a preferred material for the third AFM pinning layer 314. In a still further embodiment each of the first and second AFM biasing layers 310 and 312 and the third AFM pinning layer 314 are formed of the same antiferromagnetic material, which is preferably iridium manganese (IrMn). With this arrangement the read gap of the read head is reduced for increasing the linear read density of the read head which promotes an increase in the storage capacity of a magnetic disk drive.

Figure 14:
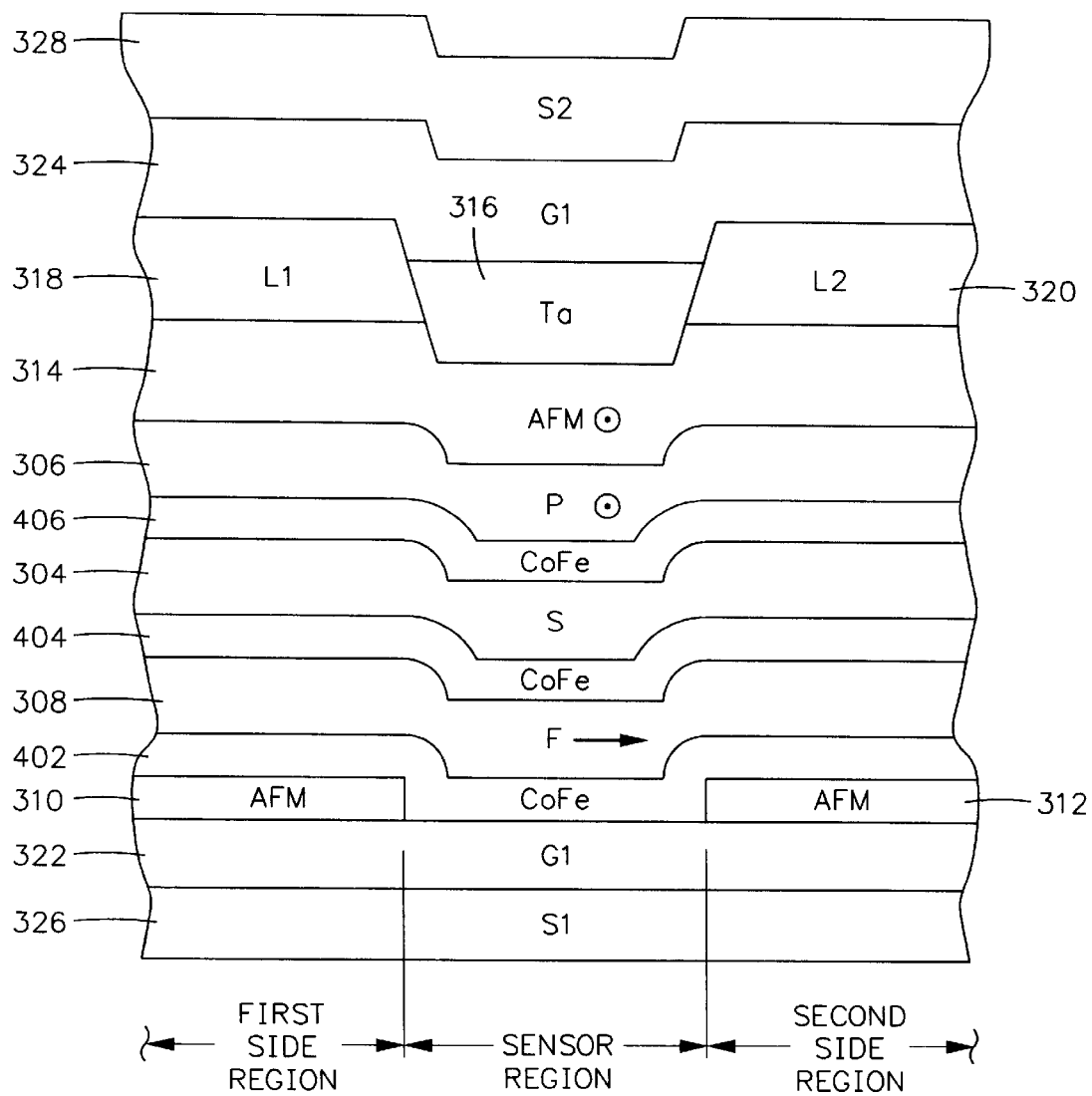
FIG. 14 is an ABS illustration of a second embodiment of the present invention.

Another embodiment 400 of the invention is illustrated in FIG. 14 which is the same as the embodiment 300 shown in FIG. 12 except the spin valve layers 304, 306, 308, 310, 312 and 314 are reversed in their order on top of the first read gap layer 322 with the first and second AFM biasing layers 310 and 312 being directly on the first read gap layer 322 and the first and second lead layers 318 and 320 being directly on the third AFM pinning layer 314. In a preferred embodiment a first cobalt iron (CoFe) layer 402 5 Å to 10 Å thick is located between the first and second AFM biasing layers and the first read gap layer 322 on one side and the free layer 308 on the other side and the spacer layer 304 is located between second and third cobalt iron (CoFe) layers 404 and 406 5 Å to 10 Å thick for the purpose of increasing the magnetoresistive coefficient (dr/R) of the read head. This type of read head is referred to in the art as a top spin because the free layer 308 is located closer to the first read gap layer 322 than it is to the second read gap layer 324. It is necessary that the third AFM pinning layer in this embodiment be formed of a conductive antiferromagnetic material, such as the materials discussed hereinabove. In a preferred embodiment the first and second AFM biasing layers 310 and 312 and the third AFM pinning layer 314 are formed of iridium manganese (IrMn).

Figure 15:
FIG. 15 is an ABS illustration of a pinned layer for a spin valve read head.
Figure 16:
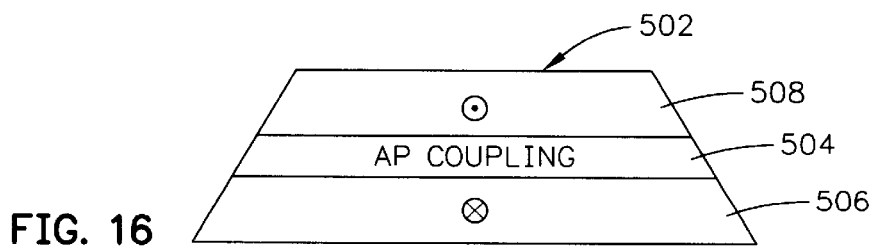
FIG. 16 is an ABS illustration of an antiparallel (AP) pinned layer for an AP pinned spin valve read head.

FIG. 15 illustrates a single pinned layer 500 which has been shown for each of the embodiments in FIGS. 12 and 14. It should be understood that the single pinned layer 500 may be replaced by an antiparallel (AP) pinned layer 502, as shown in FIG. 16. The AP pinned layer includes an AP coupling layer 504 which is located between first and second ferromagnetic pinned layers 506 and 508. The AP coupling film 604, which is typically 8 Å of ruthenium (Ru), allows an antiparallel coupling between the first and second pinned films 506 and 508. Accordingly, if the first pinned film 506 is pinned by an antiferromagnetic layer perpendicular to and away from the ABS, as shown by $\otimes$, then the pinned film 508 is pinned perpendicular to and toward the ABS, as shown by $\odot$.

Method of Setting Magnetic Moments

Figure 17:
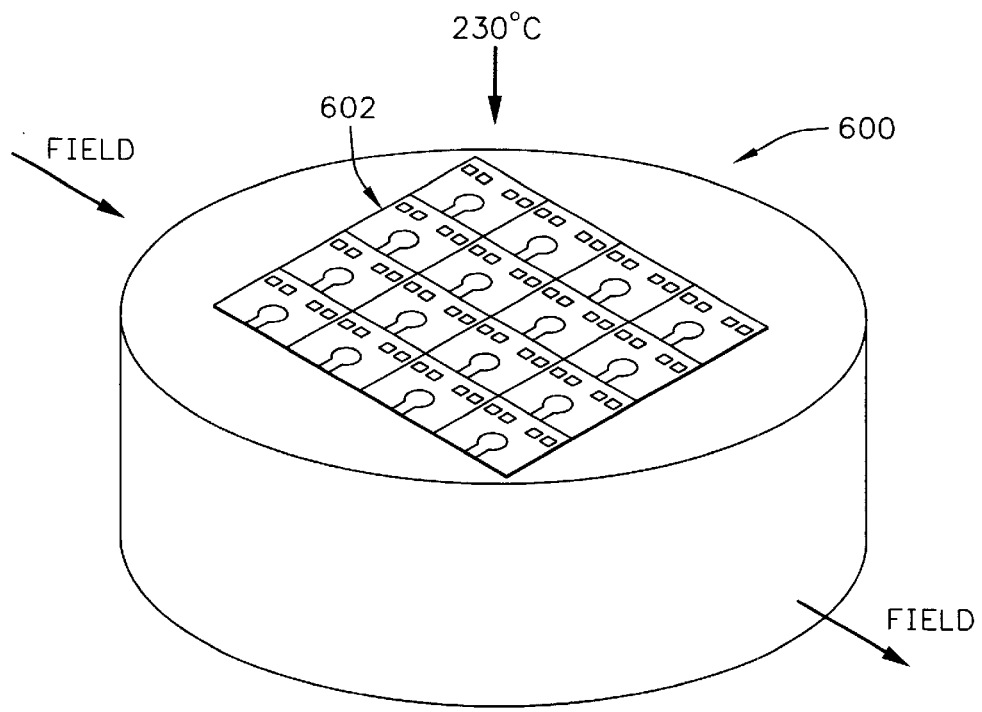
FIG. 17 is an isometric illustration of an exemplary wafer on which rows and columns of magnetic heads have been constructed.
Figure 18:
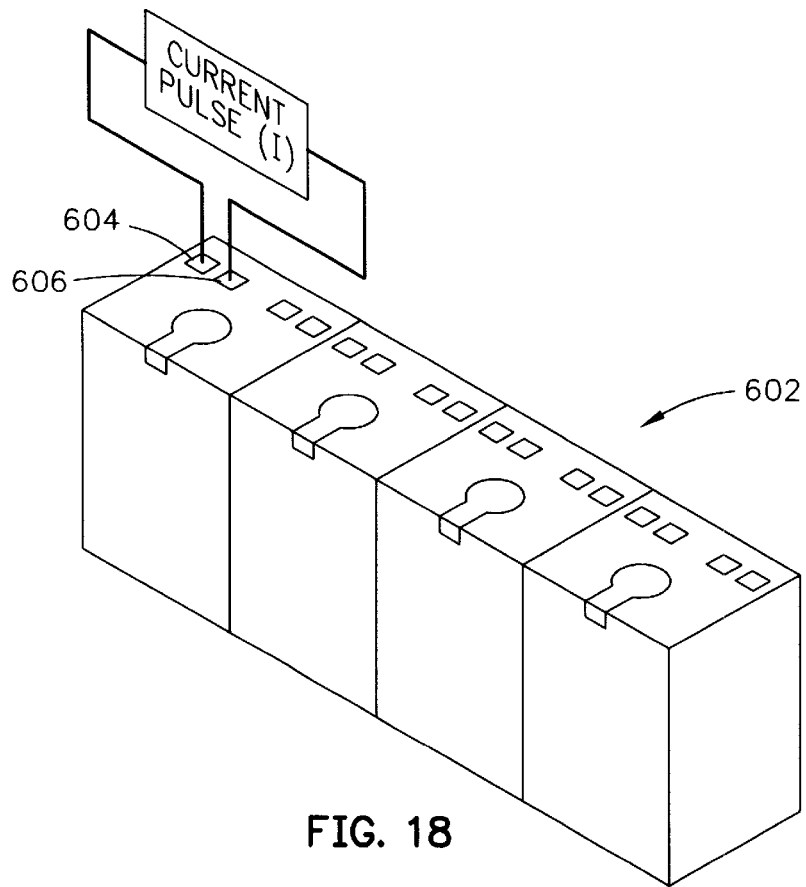
FIG. 18 is one of the rows of head of FIG. 18 after dicing the wafer.
Figure 19:
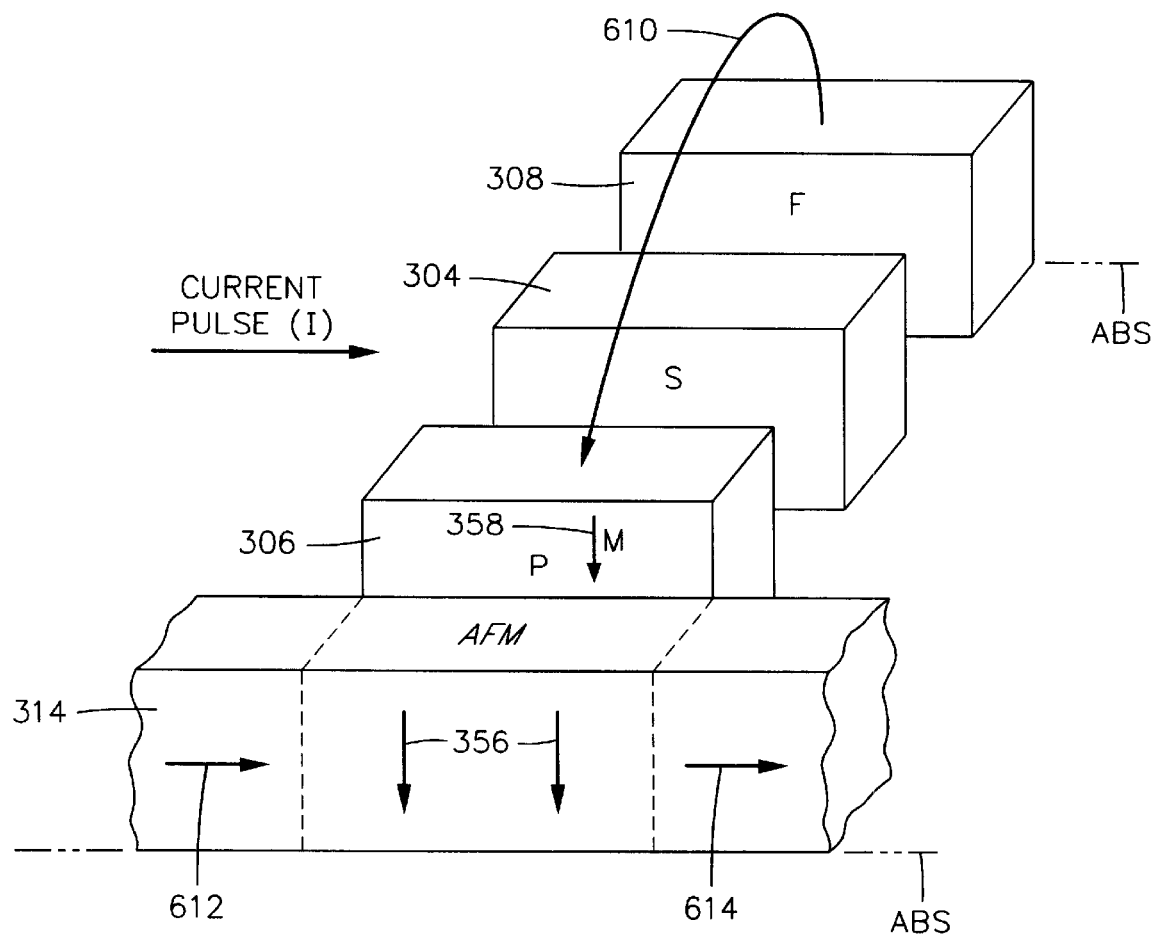
FIG. 19 is an isometric illustration of the setting of the magnetic spins of the third antiferromagnetic layer upon the application of a current pulse.

FIGS. 17, 18 and 19 show a method of setting the magnetic spins of the first and second AFM pinning layers 310 and 312 in FIG. 12 for orienting the magnetic moments of the sensor portion and the first and second side portions of the free layer 308 longitudinally along the arrows 350, 352 and 354, and for aligning the magnetic spins of the sensor portion of the AFM pinning layer 314 perpendicular to the ABS, as shown by the arrow 356 out of the paper which, in turn, pin the magnetic moment of the pinned layer 306 out of the paper as shown by the arrow 358. The magnetic spins of the first and second AFM pinning layers 310 and 312 are oriented parallel to the ABS before the magnetic spins of the AFM pinning layer 314 are oriented perpendicular to the ABS.

FIG. 17 shows a wafer 600 upon which rows and columns of magnetic heads 602 have been constructed. At the wafer level the magnetic heads may be subjected to a field, as shown, directed parallel to the ABS along the track widths of the heads in the presence of heat, such as 230° C., for setting the magnetic spins of the first and second AFM pinning layers 310 and 312 in FIG. 12. This also sets the magnetic spins of the sensor portion and the first and second side portions of the AFM pinning layer 314 in FIG. 12 parallel to the ABS. The magnetic spins of the sensor portion of the AFM pinning layer 314, however, are changed by the next step.

At the wafer level, but preferably at the row level, as shown in FIG. 18, a current pulse is applied to terminals 604 and 606 of the first and second leads 318 and 320 in FIG. 12 for applying a current pulse through the spin valve sensor 302. As shown in FIG. 19, this causes the free layer 308 to apply a current pulse field 610 on the AFM pinned layer 314. This causes the magnetic moment 358 of the pinned layer to be directed perpendicular to and toward the ABS, as shown. The current pulse also discretely generates heat in the spin valve sensor and in the sensor portion of the AFM pinning layer 314 which, in combination with the magnetic moment 358, causes magnetic spins of the sensor portion of the AFM pinning layer 314 to be directed perpendicular to and toward the ABS, as shown at 356. Because of the discrete heating by the current pulse magnetic spins of the first and second side portions of the AFM pinning layer 314 remain aligned parallel to the ABS, as shown by arrows 612 and 614. This is because the sensor portion of the AFM pinning layer 314 has been heated at or above its blocking temperature and the first and second side portions of the AFM pinning layer 314 have not been heated to their blocking temperature.

In a preferred embodiment the blocking temperature of the AFM pinning layer 314 is below 300° C. In a still preferred embodiment the blocking temperature is below 250° C. Materials suitable for this purpose are nickel oxide (NiO), alpha ferric oxide ($\alpha Fe_2O_3$), iron manganese (FeMn) and iridium manganese (IrMn) with preferred material being iridium manganese (IrMn) which has a blocking temperature of 250° C. and which has a minimum thickness of approximately 80 Å in order to implement a desired exchange coupling with the pinned layer 306.

Preferred fields in the first step shown in FIG. 18 are 5,000 Oe for a simple spin valve sensor and 12,000 Oe for an AP pinned spin valve sensor. In the second step, shown in FIGS. 18 and 19, a desired reset of the magnetic spins of the pinning layer 314 was implemented by 1 volt for a period of 100 nanoseconds. This will provide a temperature of at least 160°–180° which is sufficient for setting the magnetic spins of an iridium manganese (IrMn) AFM pinning layer 314. In the embodiment 400 in FIG. 14 the magnetic spins of the pinning layer 314 are set in the same manner as the embodiment 300 in FIG. 12. In the embodiments 300 in FIG. 12 and 400 in FIG. 14 the first step sets the magnetic spins of the first and second AFM biasing layers 310 and 312 and the second step sets the magnetic spins of the AFM pinning layer 314.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

I claim:

1. A method of making a magnetic read head having a spin valve sensor that has a sensor region located between first and second side regions comprising:

making a spin valve sensor as follows:

forming a ferromagnetic free layer that has a first sensor portion located in the sensor region and first and second side portions located in the first and second side regions wherein the first sensor portion has a magnetic moment that is free to rotate;

forming a ferromagnetic pinned layer that has a second sensor portion located in the sensor region and third and fourth side portions located in the first and second side regions wherein the second sensor portion has a magnetic moment;

forming an antiferromagnetic pinning layer that has a third sensor portion in the sensor region and fifth and sixth side portions in the first and second side regions wherein the third sensor portion is exchange coupled to the second sensor portion of the pinned layer for pinning the magnetic moment of the pinned layer;

forming a nonmagnetic conductive spacer layer between the free and pinned layers with a fourth sensor portion in the sensor region and seventh and eighth side portions in the first and second side regions;

forming first and second antiferromagnetic biasing layers in the first and second side regions that are exchange coupled to the first and second side portions of the free layer for magnetically biasing the first sensor portion of the free layer;

forming the magnetic head with an elongated air bearing surface (ABS) for facing a rotating magnetic disk wherein the elongated ABS has a longitudinal axis and is formed in part by edge surfaces of the free, pinned, pinning and spacer layers;

stacking the free, pinned, pinning and spacer layers in a direction which is perpendicular to said longitudinal axis;

forming each of the side portions of the free, pinned, pinning and spacer layers with top and bottom surfaces that lie in planes which are parallel to said longitudinal axis; and forming first and second antiferromagnetic biasing layers in the first and second side regions with bottom surfaces which interface and are exchange coupled to the top surfaces of the first and second side portions of the free layer for magnetically biasing the first sensor portion of the free layer.

2. A method of making a magnetic read head having a spin valve sensor that has a sensor region located between first and second side regions comprising:

making a spin Valve sensor as follows:

forming a ferromagnetic free layer that has a first sensor portion located in the sensor region and first and second side portions located in the first and second side regions wherein the first sensor portion has a magnetic moment that is free to rotate;

forming a ferromagnetic pinned layer that has a second sensor portion located in the sensor region and third and fourth side portions located in the first and second side regions wherein the second sensor portion has a magnetic moment;

forming an antiferromagnetic pinning layer that has a third sensor portion in the sensor region and fifth and sixth side portions in the first and second side regions wherein the third sensor portion is exchange coupled to the second sensor portion of the pinned layer for pinning the magnetic moment of the pinned layer;

forming a nonmagnetic conductive spacer layer between the free and pinned layers with a fourth sensor portion in the sensor region and seventh and eighth side portions in the first and second side regions;

forming first and second antiferromagnetic biasing layers in the first and second side regions that are exchange coupled to the first and second side portions of the free layer for magnetically biasing the first sensor portion of the free layer;

forming first and second leads in the first and second side regions and electrically connected to the side portions of the free, pinned, pinning and spacer layers for conducting a sense current through the sensor portions of the free, pinned, pinning and spacer layers in the sensor region;

forming nonmagnetic nonconductive first and second read gap layers;

forming the spin valve sensor between the first and second read gap layers;

forming ferromagnetic first and second shield layers; and forming the first and second read gap layers between the first and second shield layers.

3. A method as claimed in claim 2 including:

subjecting the read head to heat in the presence of a field for orienting magnetic spins of the first and second biasing layers along the ABS and a length of the pinned layer; and conducting a current through the spin valve sensor via the first and second leads for generating heat in the spin valve sensor and causing a current field from the free layer that orients magnetic spins of the pinning layer perpendicular to the ABS.

4. A method as claimed in claim 3 wherein the pinning layer is formed closer to the second read gap layer than the first read gap layer.

5. A method as claimed in claim 4 wherein the first and second lead layers are formed to interface the first and second biasing layer and the first and second biasing layers are formed of a conductive material.

6. A method as claimed in claim 5 wherein a material of the pinning layer has a blocking temperature less than 250° C.

7. A method as claimed in claim 6 wherein the pinning layer and the biasing layers are formed of the same material.

8. A method as claimed in claim 7 wherein each of the pinning layer and the first and second biasing layers are formed of iridium manganese (IrMn).

9. A method as claimed in claim 3 wherein the pinning layer is formed closer to the first read gap layer than to the second read gap layer.

10. A method as claimed in claim 9 wherein the first and second lead layers are formed to interface the first and second biasing layers and the first and second biasing layers are formed of a conductive material.

11. A method as claimed in claim 10 wherein a material of the pinning layer has a blocking temperature less than 250° C.

12. A method as claimed in claim 11 wherein the pinning layer and the biasing layers are formed of the same material.

13. A method as claimed in claim 12 wherein each of the pinning layer and the first and second biasing layers are formed of iridium manganese (IrMn).

14. A method of making magnetic head assembly that includes a write head and a read head that have an air bearing surface (ABS), comprising the steps of:

a making of the write head including:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and a making of the read head including:

forming a ferromagnetic first shield layer;

forming nonmagnetic nonconductive first and second read gap layers between the first and second shield layer and the first pole piece layer; and forming a spin valve sensor between the first and second read gap layers; and making a spin valve sensor of the read head including the steps of:

forming a ferromagnetic free layer that has a first sensor portion located in the sensor region and first and second side portions located in the first and second side regions wherein the first sensor portion has a magnetic moment that is free to rotate;

forming a ferromagnetic pinned layer that has a second sensor portion located in the sensor region and third and fourth side portions located in the first and second side regions wherein the second sensor portion has a magnetic moment;

forming an antiferromagnetic pinning layer that has a third sensor portion in the sensor region and fifth and sixth side portions in the first and second side regions wherein the third sensor portion is exchange coupled to the second sensor portion of the pinned layer for pinning the magnetic moment of the pinned layer;

forming a nonmagnetic conductive spacer layer between the free and pinned layers with a fourth sensor portion in the sensor region and seventh and eighth side portions, in the first and second side regions; and forming first and second antiferromagnetic biasing layers in the first and second side regions that are exchange coupled to the first and second side portions of the free layer for magnetically biasing the sensor portion of the first free layer; and a making of the read head further including:

forming first and second leads in the first and second side regions and electrically connected to the side portions of the free, pinned, pinning and spacer layers for conducting a sense current through the sensor portions of the free, pinned, pinning and spacer layers in the sensor region;

forming first and second nonmagnetic nonconductive read gap layers with the spin valve sensor and the first and second leads located therebetween; and forming a first shield layer with the first and second read gap layers located between the first shield layer and the first pole piece layer.

15. A method as claimed in claim 14 including:

subjecting the read head to heat in the presence of a field for orienting magnetic spins of the first and second biasing layers along the ABS and a length of the pinned layer; and conducting a current through the spin valve sensor via the first and second leads for generating heat in the spin valve sensor and causing a current field from the free layer that orients magnetic spins of the pinning layer perpendicular to the ABS.

16. A method as claimed in claim 15 wherein the pinning layer is formed closer to the first read gap layer than to the second read gap layer.

17. A method as claimed in claim 16 wherein the first and second lead layers are formed to interface the first and second biasing layers and the first and second biasing layers are formed of a conductive material.

18. A method as claimed in claim 17 wherein a material of the pinning layer has a blocking temperature less than 250° C.

19. A method as claimed in claim 18 wherein the pinning layer and the biasing layers are formed of the same material.

20. A method as claimed in claim 19 wherein each of the pinning layer and the first and second biasing layers are formed of iridium manganese (IrMn).

21. A method as claimed in claim 15 wherein the pinning layer is formed closer to the second read gap layer than the first read gap layer.

22. A method as claimed in claim 21 wherein the first and second lead layers are formed to interface the first and second biasing layer and the first and second biasing layers are formed of a conductive material.

23. A method as claimed in claim 22 wherein a material of the pinning layer has a blocking temperature less than 250° C.

24. A method as claimed in claim 23 wherein the pinning layer and the biasing layers are formed of the same material.

25. A method as claimed in claim 24 wherein each of the pinning layer and the first and second biasing layers are formed of iridium manganese (IrMn).

26. A method of making a magnetic read head having a spin valve sensor that has a sensor region located between first and second side regions comprising:

making a spin valve sensor as follows:

forming a ferromagnetic free layer that has a sensor portion located in the sensor region and first and second side portions located in the first and second side regions wherein the sensor portion has a magnetic moment that is free to rotate;

forming a ferromagnetic pinned layer that has a sensor portion located in the sensor region and first and second side portions located in the first and second side regions wherein the sensor portion has a magnetic moment;

forming an antiferromagnetic pinning layer that has a sensor portion in the sensor region and first and second side portions in the first and second side regions wherein the sensor portion of the pinning layer is exchange coupled to the sensor portion of the pinned layer for pinning the magnetic moment of the pinned layer;

forming a nonmagnetic conductive spacer layer between the free and pinned layers with a sensor portion in the sensor region and first and second side portions in the first and second side regions;

forming first and second antiferromagnetic biasing layers in the first and second side regions that are exchange coupled to the first and second side portions of the free layer for magnetically biasing the sensor portion of the free layer.

* * * * *

UNITED STATES PATENT AND TRADEMARK OFFICE
CERTIFICATE OF CORRECTION

PATENT NO. : 6,751,845 B2
DATED : June 22, 2004
INVENTOR(S) : Gill

It is certified that error appears in the above-identified patent and that said Letters Patent is hereby corrected as shown below:

<u>Title page,</u>
Item [*] Notice, change "days." (first instance) to -- 214 --.

Signed and Sealed this

Twenty-first Day of December, 2004

JON W. DUDAS
*Director of the United States Patent and Trademark Office*